United States Patent
Scribner et al.

(10) Patent No.: US 9,790,676 B2
(45) Date of Patent: Oct. 17, 2017

(54) DELAYED SHUTOFF DEVICE

(71) Applicant: Innovative Devices LLC, Cumberland Foreside, ME (US)

(72) Inventors: Guy Lewis Scribner, Saco, ME (US); Payton Hurlin Scribner, Saco, ME (US); Kenneth Stephen Ray, Cumberland Foreside, ME (US)

(73) Assignee: Innovative Devices LLC, Cumberland Foreside, ME (US)

( * ) Notice: Subject to any disclaimer, the term of this patent is extended or adjusted under 35 U.S.C. 154(b) by 273 days.

(21) Appl. No.: 14/340,743

(22) Filed: Jul. 25, 2014

(65) Prior Publication Data
US 2016/0024771 A1  Jan. 28, 2016

(51) Int. Cl.
| | |
|---|---|
| *E03D 1/33* | (2006.01) |
| *F16K 27/02* | (2006.01) |
| *F16K 31/20* | (2006.01) |
| *E03B 7/07* | (2006.01) |
| *F16K 21/16* | (2006.01) |
| *E03D 1/32* | (2006.01) |

(52) U.S. Cl.
CPC .............. *E03D 1/33* (2013.01); *E03B 7/071* (2013.01); *F16K 21/16* (2013.01); *F16K 27/02* (2013.01); *F16K 31/20* (2013.01); *E03D 1/32* (2013.01)

(58) Field of Classification Search
CPC .......... E03D 1/33; E03D 1/32; G05D 7/0146; F16K 31/20; F16K 31/18; F16K 27/02; F16K 21/16

USPC ....... 137/533, 519, 516.25, 460, 398, 519.5, 137/533.11, 513.5, 513.7
See application file for complete search history.

(56) References Cited

U.S. PATENT DOCUMENTS

| | | | |
|---|---|---|---|
| 1,223,170 A |  | 4/1917 | Hodgson |
| 1,788,358 A | * | 1/1931 | Goerg ..................... F16K 15/04 |
| | | | 137/513.7 |
| 2,105,893 A |  | 1/1938 | Salmonsen |
| 2,202,099 A | * | 5/1940 | Gillen ....................... G01F 1/20 |
| | | | 137/112 |
| 2,646,069 A |  | 7/1953 | Dorff |
| 2,709,264 A |  | 5/1955 | Stierlen |
| 2,767,551 A | * | 10/1956 | Clute .................... F17C 13/021 |
| | | | 137/390 |
| 2,895,500 A | * | 7/1959 | Barnett ................ G05D 7/0146 |
| | | | 137/468 |
| 3,478,881 A |  | 11/1969 | Bozek |

(Continued)

*Primary Examiner* — Craig Schneider
*Assistant Examiner* — P. Macade Nichols
(74) *Attorney, Agent, or Firm* — Pierce Atwood LLP; Kevin M. Farrell; David J. Wilson

(57) ABSTRACT

A delayed shutoff device comprises a conduit configured to allow a fluid to flow through, wherein the conduit includes a conduit start and a conduit end. The device further comprises a plug configured to be placed inside the conduit at the conduit start; move inside the conduit from the conduit start toward the conduit end when the fluid flows through the conduit; and reduce the fluid flow upon reaching the conduit end. The device is configured to allow a pass-through quantity of the fluid to pass through the conduit while the plug moves from the conduit start to the conduit end. The conduit end may form a seat, the plug being configured to stop moving upon reaching the seat. The plug may be configured to fit the seat imperfectly, to allow a seepage of the fluid after reaching the seat.

27 Claims, 13 Drawing Sheets

(56) References Cited

U.S. PATENT DOCUMENTS

| | | | |
|---|---|---|---|
| 3,901,315 A | | 8/1975 | Parker et al. |
| 3,987,849 A | | 10/1976 | Mott |
| 4,049,018 A | | 9/1977 | Skibowski |
| 4,364,825 A | | 12/1982 | Connor, Jr. |
| 4,485,011 A | | 11/1984 | Cole et al. |
| 4,633,681 A | * | 1/1987 | Webber ............ F25B 41/06 137/202 |
| 4,825,897 A | * | 5/1989 | Shade ............ F16K 17/24 137/271 |
| 5,248,414 A | | 9/1993 | Perkins |
| 5,265,641 A | | 11/1993 | Anderson et al. |
| 5,280,806 A | | 1/1994 | Glazebrook |
| 5,553,333 A | | 9/1996 | Andersson |
| 6,578,604 B1 | | 6/2003 | Adriansens |
| 7,051,951 B2 | | 5/2006 | Magi et al. |
| 7,171,981 B2 | | 2/2007 | Shade et al. |
| 7,533,689 B2 | | 5/2009 | Goble |
| 7,644,726 B1 | | 1/2010 | Achterman |
| 7,743,786 B2 | | 6/2010 | Madama et al. |
| 727,244 A1 | | 4/2015 | Hashimoto |
| 2006/0151732 A1 | | 7/2006 | Oh et al. |
| 2008/0047052 A1 | | 2/2008 | Han |
| 2010/0146692 A1 | | 6/2010 | Ramirez |
| 2010/0193048 A1 | | 8/2010 | Chang |

\* cited by examiner

DELAYED SHUTOFF DEVICE

TECHNICAL FIELD

The present disclosure relates generally to flow controls and particularly to delayed shutoff devices.

BACKGROUND

Various systems that use a flowing fluid require a shutoff mechanism to stop the flow once the system's operation is complete. Common toilet tanks, for example, include a floater mechanism for controlling the flow of water into the toilet tank. The floater mechanism includes parts such as a flush valve, a float, and a fill valve. When functioning properly, after the toilet is flushed, the floater mechanism allows the water to fill the tank to a desired level and then shuts off the water flow. More specifically, after the flushing, the flush valve blocks the outflow of the water from the tank into the toilet bowl, causing the water to rise in the tank. The rising water level raises the float. When the water level in the tank reaches a desired level, the float causes the fill valve to stop the water inflow into the tank. Other systems that use water or some other fluid may also use some shutoff mechanism. Examples of such systems include a sprinkler, an irrigation system, or a pool filler.

The shutoff mechanism in many such systems, however, may break down for a variety of reasons. The floater mechanism, for example, may break down if one or more of its parts are defective, or when something interferes with the proper operation of the system. For example, the flush valve may fail to block the outflow, the float may fail to rise or shut the fill valve, or the fill valve may fail to stop the water inflow into tank. In such cases, the fluid flow may continue, resulting in damages (e.g., due to flooding) or waste (e.g., over consumption of water).

SUMMARY

In some embodiments, a delayed shutoff device comprises a conduit configured to allow a fluid to flow through, wherein the conduit includes a conduit start and a conduit end; and a plug configured to be placed inside the conduit at the conduit start; move inside the conduit from the conduit start toward the conduit end when the fluid flows through the conduit; and block the fluid flow upon reaching the conduit end, wherein the conduit and the plug are configured to allow a pass-through quantity of the fluid to pass through the conduit while the plug moves from the conduit start to the conduit end; and the pass-through quantity is larger than or equal to a preset quantity.

In some embodiments the conduit end forms a seat, and the plug is configured to stop moving upon reaching the seat. In some embodiments the plug is configured to fit the seat upon reaching the seat. In some embodiments the plug is configured to fit the seat imperfectly, to allow a seepage of the fluid after reaching the seat. In some embodiments the imperfect fit results from one or more of a crack or a recession in a surface of the plug configured to touch the seat, a crack or a recession in a surface of the seat configured to touch the plug, and a difference in a shape of the plug and a shape of the seat.

In some embodiments the plug is configured to stop the fluid flow upon reaching the conduit end. In some embodiments the plug is configured to substantially reduce the fluid flow upon reaching the conduit end. In some embodiments substantially reducing the fluid flow includes allowing a fluid seepage through the conduit end. Some embodiments further comprise a pre-shutoff reset mechanism, wherein the pre-shutoff reset mechanism enables the plug to return to the conduit start if the fluid flow stops before the plug reaches the conduit end.

In some embodiments, the device further comprises a post-shutoff reset mechanism, wherein the post-shutoff reset mechanism enables the plug to return to the conduit start when a pressure of the fluid is reduced after the plug reaches the conduit end. In some embodiments the conduit is configured to direct the fluid to flow to a container, the device further comprising a seepage channel configured to allow the fluid to seep between the conduit and the container after the plug reaches the conduit end.

In some embodiments the seepage channel includes an imperfection in a fit between the plug and the conduit end. In some embodiments the seepage channel is configured to allow the fluid to seep from the conduit into the container after the plug reaches the conduit end. In some embodiments the conduit end is a distal end of the conduit; the conduit further including a proximal end; the conduit is configured to allow the fluid to flow from the proximal end to the distal end; and the conduit is configured to be installed such that the distal end is higher than the proximal end.

In some embodiments the plug is configured to move inside the conduit toward the conduit end due to a pressure of the fluid flow. In some embodiments the conduit includes a hollow cylinder, the conduit end includes an end of the hollow cylinder, the plug is placed inside the hollow cylinder, the plug is configured to move along a long axis of the hollow cylinder toward the end of the hollow cylinder. In some embodiments the plug includes a spherical ball, a cylinder with a conical end, or a disk.

In some embodiments the conduit forms at least a primary channel and a secondary channel; the primary channel is configured to house the plug and direct the plug toward the conduit end; and the secondary channel is configured to allow at least part of the pass-through quantity to pass through the conduit before the plug reaches the conduit end.

In some embodiments the conduit forms a passage configured to house the plug and direct the plug toward the conduit end; and the plug is sized such that it allows at least part of the pass-through quantity to flow through the passage while the plug moves inside the conduit toward the conduit end. In some embodiments the plug is configured to move inside the conduit for a preset duration of time before reaching the conduit end. In some embodiments the preset duration of time depends on one or both of a characteristic of the plug and a characteristic of the fluid flow. In some embodiments the characteristic of the plug includes one or more of a weight of the plug, a shape of the plug, or a size of the plug. In some embodiments the characteristic of the fluid flow includes one or more of a pressure of the fluid flow, a speed of the fluid flow, a density of the fluid.

In some embodiments the plug is a first plug of a plurality of plugs configured to be placed inside the conduit; the plurality of plugs differ in one or more characteristics; the one or more characteristics of the first plug are such that the first plug allows the pass-through quantity to pass through the conduit before the first plug reaches the conduit end. In some embodiments the conduit is configured to direct the fluid to flow to a container; and the preset quantity is larger than or equal to a capacity of the container. In some embodiments the container is a toilet tank.

In some embodiments the container is attached to a primary shut off system configured to stop the fluid flow when the container is filled to the capacity; and the device blocks the fluid flow when the primary shut off system does not function as configured. In some embodiments the fluid is water. In some embodiments the conduit and the plug are configured to reset the device when the fluid flow stops before the plug reaches the conduit end. In some embodiments resetting the device includes the plug returning to the conduit start.

Some embodiments provide a method for tuning a delayed shutoff device, wherein the device comprises a conduit configured to connect a source of a fluid to a target, and allow the fluid to flow through the conduit from the source to the target; and a plug configured to be placed inside the conduit, block the fluid flow after a pass-through quantity passes through the conduit from the source to the target. The method comprises attaching the conduit to the source and to the target; testing the plug, wherein the testing includes placing the plug inside the conduit; causing the fluid to flow through the conduit from the source to the target; measuring the pass-through quantity; and accepting the plug when the pass-through quantity is larger than or equal to a preset quantity. In some embodiments the plug is a first plug; the delayed shutoff device comprises a second plug; and the method further comprises rejecting the first plug when the pass-through quantity is smaller than the preset quantity; and testing the second plug. In some embodiments the target is a toilet tank, a sprinkler, or a pool filler.

Some embodiments provide a method for setting up a delayed shutoff device, wherein the device comprises a conduit configured to connect a source of a fluid to a target, and allow the fluid to flow through the conduit from the source to the target; and a plug configured to be placed inside the conduit, block the fluid flow after a pass-through quantity passes through the conduit from the source to the target. The method comprises attaching the conduit to the source and to the target; tuning the conduit and the plug such that the pass-through quantity is larger than or equal to a preset quantity. In some embodiments tuning comprises tilting the conduit. In some embodiments the device comprises a plurality of plugs; and the tuning comprises allowing the fluid to flow through the conduit; measuring a fill time during which a preset quantity of the fluid flows through the conduit; selecting one of the plurality of plugs based on the fill time.

Some embodiments provide a delayed shutoff device comprising a conduit configured to allow a fluid to flow through, wherein the conduit includes a conduit start and a conduit end; and a plug configured to: be placed inside the conduit at the conduit start; move inside the conduit from the conduit start toward the conduit end when the fluid flows through the conduit; and block the fluid flow upon reaching the conduit end, wherein: the conduit and the plug are configured to allow the fluid to pass through the conduit for a delay interval during which the plug moves from the conduit start to the conduit end; and the delay interval is larger than or equal to a preset interval.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings.

DETAILED DESCRIPTION

Figure 1A:
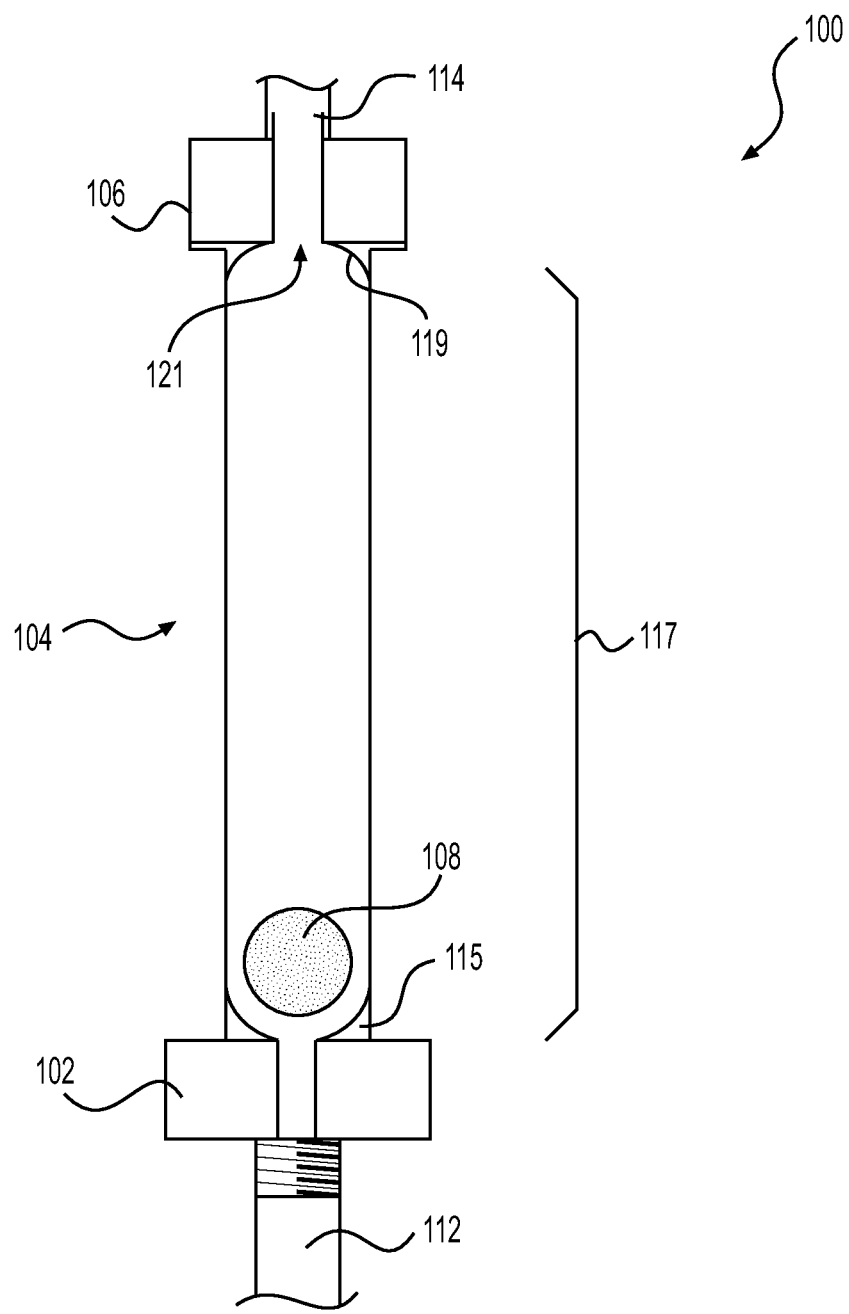
FIGS. 1A-1C show different views of a delayed shutoff device according to an embodiment.

The following detailed description refers to the accompanying drawings. Wherever possible, the same or similar reference numbers are used in the drawings or in the description to refer to the same or similar parts. Also, similarly-named elements may perform similar functions and may be similarly designed, unless specified otherwise. Numerous details are set forth to provide an understanding of the described embodiments. The embodiments may be practiced without these details. In other instances, well-known methods, procedures, and components have not been described in detail to avoid obscuring the described embodiments.

While several exemplary embodiments and features are described here, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. Instead, the proper scope of the embodiments is defined by the appended claims. Further, stating that a feature may exist indicates that the feature may exist in one or more embodiments.

In this disclosure, the terms "include," "comprise," "contain," and "have," when used after a set or a system, mean an open inclusion and do not exclude addition of other, non-enumerated, members to the set or to the system. Moreover, as used in this disclosure, a subset of a set can include one or more than one, including all, members of the set.

Different embodiments provide a mechanism for avoiding continued flow of a fluid in a system, when the system's operation is complete. To that end, some embodiments provide delayed shutoff devices for insertion along the flow of the fluid. The device may allow some of the fluid to flow into the target for a delay interval after the flow starts and then block the flow. The delay allows some quantity of the fluid to pass through the device before blocking the flow. This quantity, called pass-through quantity, may be adjusted based on the requirements of the system in which the shutoff device is used. In a system that includes its own primary shutoff mechanism (e.g., the toilet tank with the floater mechanism), the delayed shutoff device may operate as a secondary mechanism to back up the primary mechanism. The delayed shutoff device may be tuned to operate if the primary mechanism breaks down or does not function properly. This tuning may include adjusting the pass-through quantity to be a quantity that should trigger a properly functioning primary shutoff mechanism. By blocking the flow after the delay interval, the device may completely stop the flow. Alternatively, by blocking the flow, the device may substantially reduce the flow of the fluid. Substantially reducing the flow may amount to allowing some small flow to continue, e.g., in the form of a seepage as further explained below.

FIG. 1A shows a longitudinal cross section of a delayed shutoff device 100 according to an embodiment. Device 100 includes an inlet section 102, a conduit 104, an outlet section 106, and a plug 108. Conduit 104 connects inlet section 102 to outlet section 106. Plug 108 is configured to fit inside conduit 104, and move between a start section and an end section of conduit 104 in a manner detailed below.

Device 100 is configured for insertion in the path of the fluid flow between an inlet port 112 and an outlet port 114. In particular, inlet section 102 attaches to inlet port 112 and outlet section 106 attaches to outlet port 114. These ports and sections may be pipe shaped ends or connections that attach to each other. The attachments may be in the form of soldering, screwing, or else. Inlet port 112 delivers an inlet flow of the fluid from a fluid source to device 100 and outlet port 114 carries an outlet flow of the fluid away from device 100 to a target system. For example, the target may be a toilet tank and the source may be a water pipe for delivering water to the toilet tank.

When the fluid flows through device 100, it passes through conduit 104. In the embodiment shown in FIG. 1A, conduit 104 includes a conduit start section 115, a conduit middle section 117, and a conduit end section 119. Conduit start 115 is connected to inlet section 102 and conduit end 119 is connected to outlet section 106. Further, conduit middle section 117 connects conduit start 115 to conduit end 119. In the embodiment shown in FIG. 1A, conduit middle section 117 is in the form of a hollow cylinder. Conduit start 115 and conduit end 119 are also hollow in the middle. These sections may connect to the hollow cylinder via openings that are narrower than the hollow cylinder. In particular, conduit end 119 forms an opening 121 that connects the hollow cylinder to outlet section 106.

Plug 108 is configured to be placed inside conduit middle section 117 and move between conduit start 115 and conduit end 119. In the embodiment shown in FIG. 1A, plug 108 is a spherical ball. The spherical ball may be hollow or solid. The diameter of plug 108 is smaller than the inner diameter of conduit middle section 117 and larger than the maximum inner dimension of the openings of the conduit start 115 and conduit end 119. In this manner, when plug 108 is placed inside the conduit middle 117, it can freely move between conduit start 115 and conduit end 119, but cannot leave the conduit middle 117 by passing through the openings in conduit start 115 and conduit end 119.

When fluid flows through the system and passes through device 100, it may push plug 108 toward conduit end 119. In FIG. 1A, device 100 is depicted in a vertical configuration. In various embodiments, however, device 100 may also be installed and operated in non-vertical, such as tilted, configurations. In some embodiments, device 100 is installed such that conduit end 119 is positioned higher than conduit start 115. When the fluid is not flowing, plug 108 may rest at or near conduit start 115 due to the weight of the plug, a component of which may pull the plug toward the conduit start. As the flow starts, the fluid's pressure force on plug 108 may exceed the component of weight that pulls the plug back. The fluid pressure may thus push plug 108 toward the conduit end. If the fluid flow continues, plug 108 may reach conduit end after a time interval, i.e., the delay interval.

During the delay interval, some fluid may pass through conduit 104 and outlet port 114. In FIG. 1A, for example, some of the flowing fluid may pass around plug 108 while plug 108 is pushed toward conduit end 119. Device 100, therefore, allows a quantity of fluid, called a pass-through quantity, to reach the target during the delay interval.

Figure 1B:
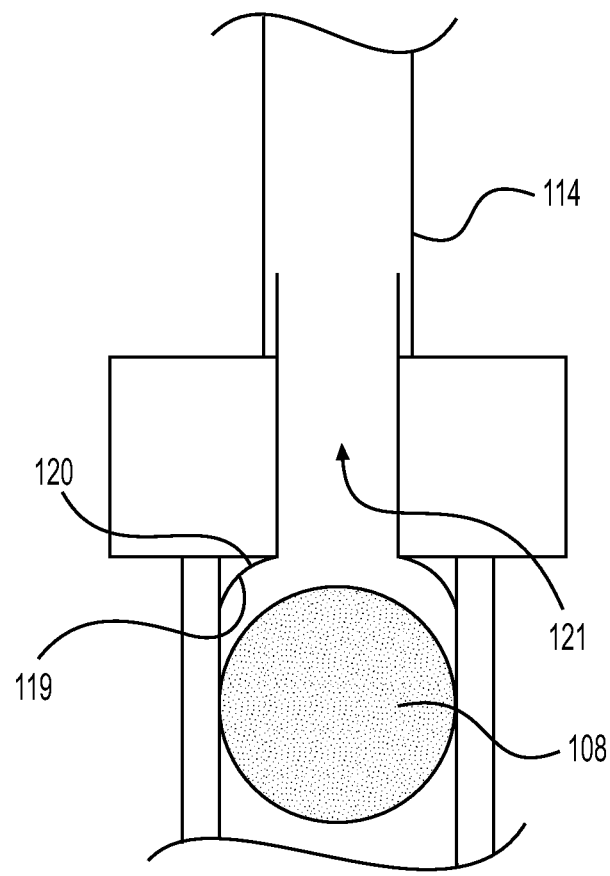

Upon reaching the conduit end, the plug may block the fluid flow. FIG. 1B shows a magnified view of plug 108 after reaching conduit end 119 according to some embodiments. Conduit end 119 forms a seat 120, which is a section of the lower surface of the conduit end that contacts the plug when the plug reaches the conduit end. Seat 120 may partially or completely fit the shape of plug 108. In FIG. 1B, for example, plug 108 is a spherical ball and seat 120 may also be shaped as part of a surface with a curvature radius that is equal or close to that of the spherical ball. Due to this fit, plug 108 may partially or fully block opening 121, thus blocking the fluid from flowing into outlet port 114 and reaching the target.

In some embodiments, the delayed shutoff device also includes a seepage mechanism. The seepage mechanism may allow some fluid to seep through the device into the target after the delay interval, that is, after the plug reaches the conduit end and fits over the seat. The seepage mechanism may include an imperfect fit between the plug and the seat, or an imperfection in the shape of one or both of the seat and the plug. In some embodiments, for example, the fit between the contacting surfaces of the plug and the seat may not be perfect. These two surfaces may, for example, have different curvatures.

Figure 1C:
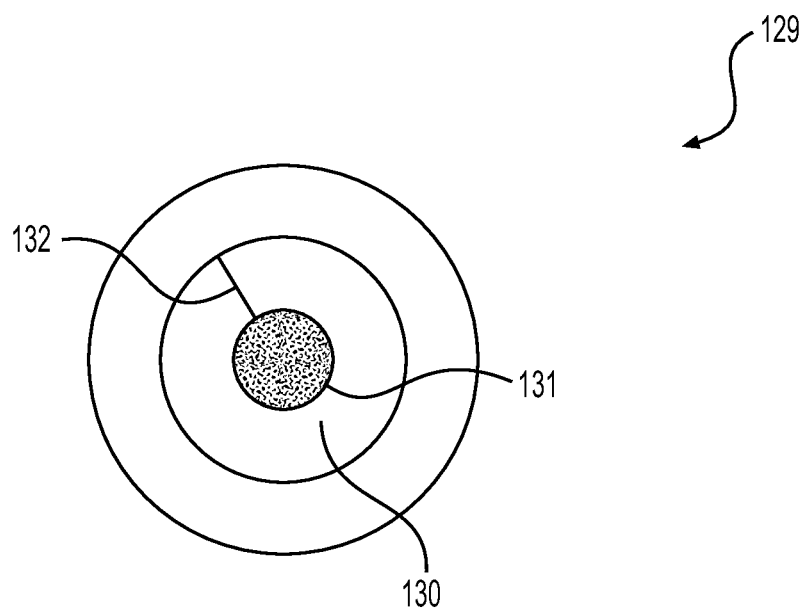

The imperfection may include an irregularity, or a defect in the plug or the seat. FIG. 1C shows an upper view of a conduit end 129 with such imperfection according to an embodiment. Conduit end 129 forms a seat 130, which defines an opening 131. Seat 130 also includes a crack 132. Crack 132 causes the fluid to seep through seat 130 after a plug blocks opening 131. The imperfection may also include other types of irregularity, such as patterns, dimples, or depressions in the surface of the plug or in the surface of the seat. Such irregularities may allow some seepage after the plug fits over the seat.

Some embodiments include a post-shutoff reset mechanism that enables the device to reset after the plug reaches the conduit end. In some embodiments, the post-shutoff reset mechanism utilizes the seepage mechanism. This resetting may occur after the delayed shutoff device blocks the fluid flow and then the inlet flow stops. In some embodiments, the inlet flow may stop when a user shuts off the fluid flow using an external shutoff valve location along the flow and before the inlet port. After the inlet flow stops, the seepage mechanism may reduce the pressure behind the plug, allowing the plug to move back toward the conduit start section. In some embodiments, the seepage flow is configured such that it enables this reduction in the pressure and the post-shutoff reset mechanism.

Figure 2:
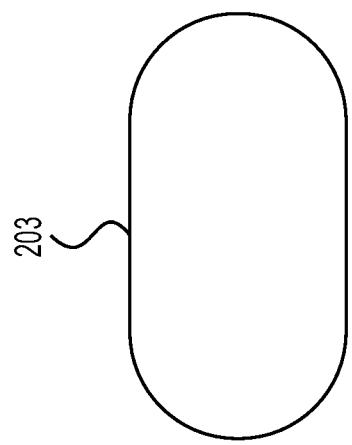
FIG. 2 depicts longitudinal cross-sections of three different types of plugs according to various embodiments.
Figure 2:
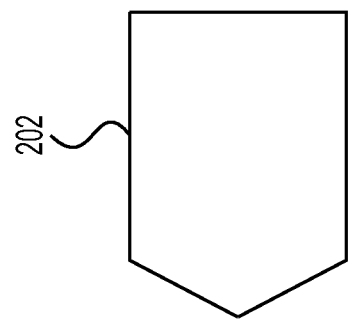
Figure 2:
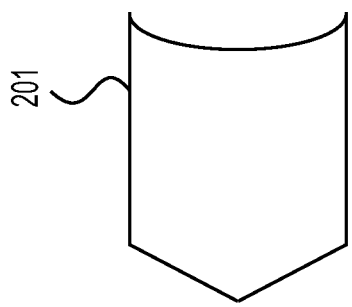

The plug used in the delayed shutoff device may take different forms. FIG. 2 depicts longitudinal cross-sections of three different types of plugs 201-203 according to various embodiments. Each plug may have a top part, a middle part, and a bottom part. When placed inside the conduit, the top part may point toward the conduit end section while the bottom part may point towards the conduit start section.

In plugs 201-203, the middle parts have a cylindrical shape. In plugs 201 and 202, the top parts have a pointed conical shape. In plug 201 the bottom has a concave curved shape, such as cross section of a sphere. In plug 202, on the other hand, the bottom is flat. In plug 203, the top and bottom both have convex curved shapes, such as half spheres.

Plugs 201-203 have asymmetries that may affect their function inside the conduit. In particular, they have elongated shapes that may prevent them from rolling inside the conduit. For plugs 201-203, the longitudinal dimension can be larger than the transversal dimension. For example, the middle cylindrical part can have a height that is larger than its diameter. Such a plug can be placed inside a conduit with a transversal diameter that is smaller than the plug's transversal dimension. When moving inside the conduit, such a plug maintains its orientation with its top pointing toward the conduit end. A spherical plug, such as the one shown in FIG. 1A, on the other hand, may roll while moving inside the conduit. In each case, the conduit end may be shaped to fit the shape of the plug top, thus enabling the plug to fully or partially block the opening in the conduit end.

Figure 3:
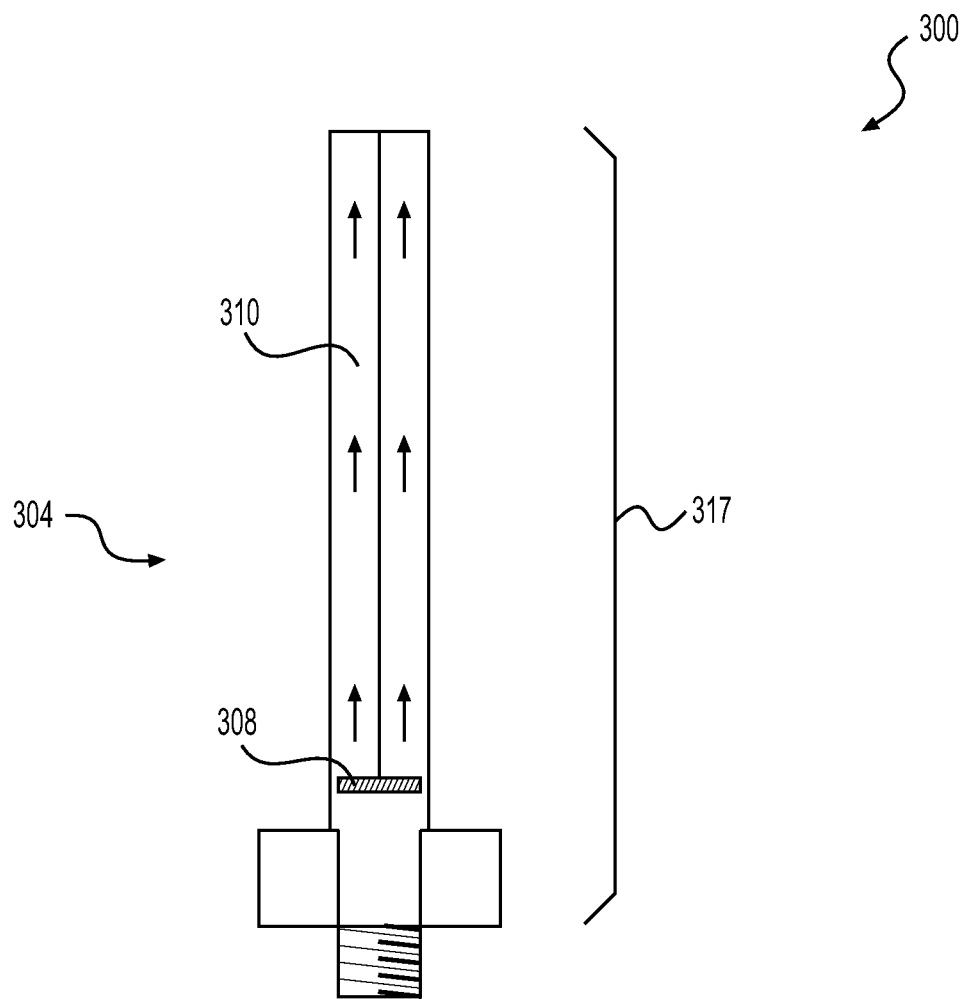
FIG. 3 shows a longitudinal cross section of sections of a delayed shutoff device using another type of plug according to an embodiment.

FIG. 3 shows a longitudinal cross section of sections of a delayed shutoff device 300 using another type of plug according to an embodiment. In particular, device 300 includes a conduit 304, itself including a middle section 317. Moreover, device 300 includes a plug 308 and a plug lead 310. Plug 308 has a flat shape. In an embodiment where middle section 317 forms a hollow cylinder to house the plug, flat plug 308 may be a circular disk. Plug lead 310 may be shaped as a rod or a ribbon that passes through a slot in the middle of flat plug 308. Plug lead 310 may further be held in the center of conduit middle section 317 through, for example, fixations on one or both ends of device 300. When the fluid flows, flat plug 308 may move toward conduit end while fixed in the center of the conduit by plug lead 310. Upon reaching the conduit end, flat plug 308 may fully or partially block the opening there, thus stopping or reducing the fluid flow.

In different embodiments, the delayed shutoff device includes a pass-through mechanism. The pass-through mechanism is configured to allow some portion of the fluid to flow through the device and reach the target system during the delay interval. This flow, called the pass-through flow, may deliver part or all of the pass-through quantity to the target. Different embodiments may use different types of pass-through mechanisms. In the embodiment shown in FIG. 1A, for example, the pass-through mechanism includes a bypass gap formed between the outer surface of plug 108 and the inner surface of conduit middles section 117. This gap may form because, for example, the width of plug 108 is smaller than the width of the hollow cavity of middle section 117. For example, when plug 108 is a sphere and middle section 117 is hollow cylinder, the diameter of the sphere may be smaller than the diameter of the cross section of the cylinder. The difference creates a gap through which a quantity of the fluid (called a bypass quantity) can bypass the plug during the delay interval.

Some embodiments include a pre-shutoff reset mechanism. The pre-shutoff reset mechanism enables the device to reset itself if the fluid flow stops due to other mechanisms before the plug reaches the conduit end and shuts off or reduces the flow. The fluid flow may stop in such a situation because a primary shutoff system kicks in. The pre-shutoff reset mechanism may use the pass-through mechanism for moving the plug to its starting position. In particular, if the fluid flow stops before the plug reaches the conduit end, its forward force on the plug may be eliminated. In such a case, the plug may be pulled back by a component of its weight. At the same time, the pass-through mechanism may allow the fluid to go around the plug, thus reducing the fluid's resistance to the plug's backward movement. The plug may thus move all the way back to its initial position near the conduit start, thus resetting the device.

The pass-through mechanism may not operate after the delay interval. In the embodiment shown in FIG. 1A, for example, conduit 104 narrows at conduit end 119, thus eliminating the gap between the outer surface of plug 108 and the inner surface of conduit end 119. In some embodiments, instead of the curved conduit end 119 shown in FIG. 1C, conduit end takes other shapes that eliminate the gap. The conduit end may, for example, be shaped as a truncated circular cone, which narrows down as moving away from the middle section. A spherical plug, for example, stops when reaching a section of the cone that has the same inner diameter as the diameter of the sphere. That section of the conduit end thus forms a seat for the plug. Similarly, in some embodiments, the conduit's middle and end sections together form a truncated cone. That is, the conduit itself is a truncated cone that narrows down from the inlet section toward the outlet section. The outer diameter of plug 108 may be smaller than the starting diameter of the conduit, and equal to or larger than the ending diameter of the conduit.

Some embodiments allow a pass-through quantity that at least equals a preset minimum quantity of the fluid. The preset minimum quantity may, for example, be equal to or more than an amount required by the target. When the target is a container such as a toilet tank, for example, the preset minimum quantity may be equal to or larger than the capacity of the container. When the target is a sprinkler system, on the other hand, the preset minimum quantity may be equal to or larger than an amount that the sprinkler requires for one full round of operation. Some embodiments use a preset minimum quantity that is larger than the required quantity that activates another shutoff mechanism. The required quantity may, for example, be equal to the capacity of the toilet tank, which should activate the tank's floater mechanism. In such a case, therefore, the delayed shutoff mechanism shuts off or reduces the flow after the other shutoff mechanism fails to operate according to its design.

In some embodiments, the pass-through quantity is set such that it does not exceed a preset maximum quantity. The preset maximum quantity may be set such that, for example, allowing a pass-through quantity more than that damages the target system or causes other problems. In some embodiments, for example, allowing larger amounts may flood the location of the target causing water damage to the location. In another embodiment, for example, allowing larger amounts may drive the fluid consumption beyond a limit that requires payment of penalties or higher consumption rates.

Some embodiments allow the delay interval to be adjusted based on a preset condition. In some embodiments, the delay interval is set to be at least equal a preset minimum interval. In some embodiments, the delay interval is set to be less than or equal to a preset maximum interval. The preset minimum or maximum intervals may be time durations that allow the pass-through quantity to be more than a preset minimum quantity or less than a preset maximum quantity, respectively.

Figure 4:
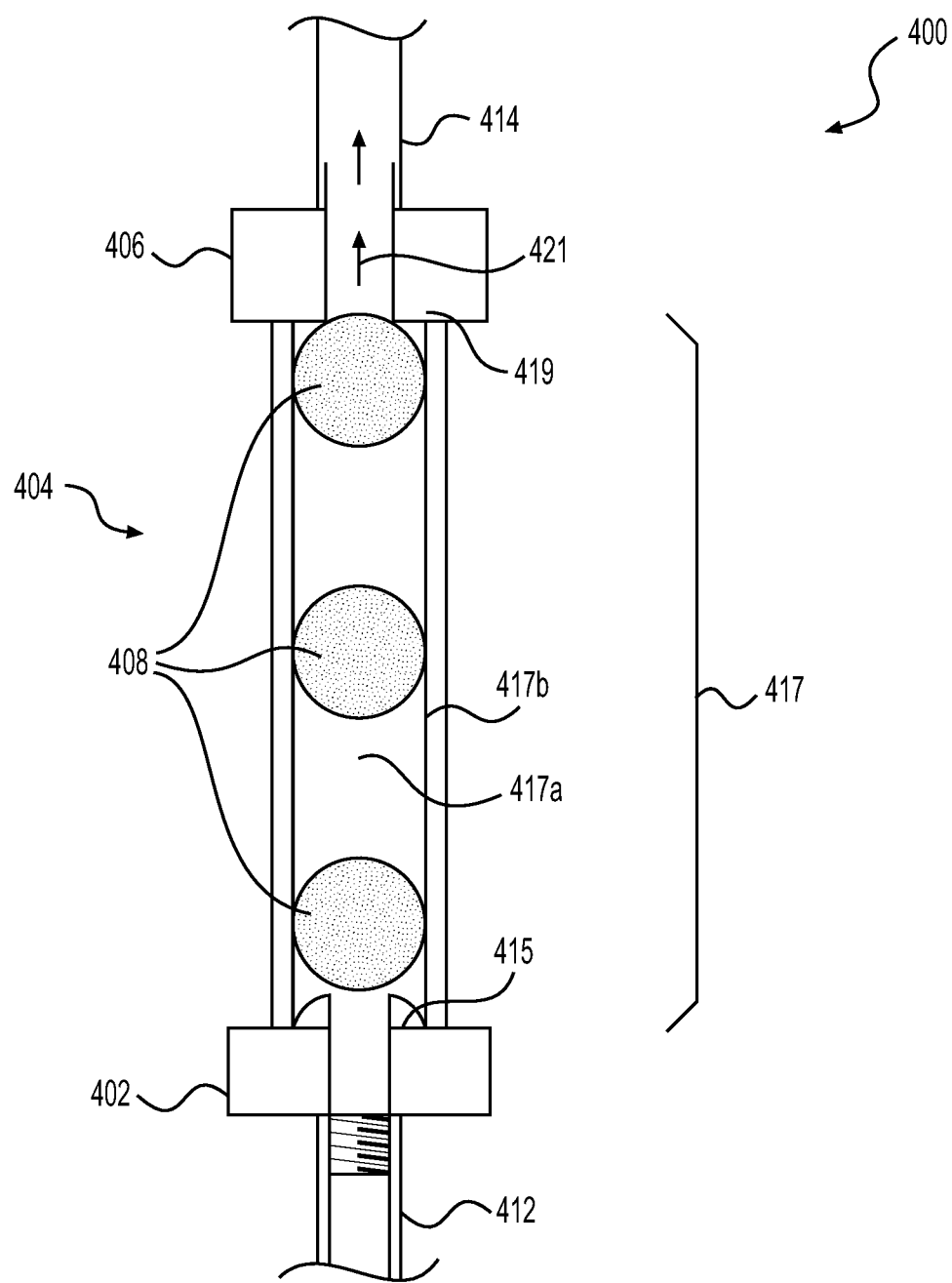
FIG. 4 shows a longitudinal cross section of a delayed shutoff device according to an embodiment.

Some embodiments use pass-through mechanisms that are different from the bypass gap. FIG. 4 shows a longitudinal cross section of a delayed shutoff device 400 according to such an embodiment. Device 400 is configured for insertion in the path of the fluid flow between an inlet port 412 and an outlet port 414. Device 400 includes an inlet section 402, a conduit 404, an outlet section 406, and a plug 408. Moreover, conduit 404 includes a conduit start section 415, a conduit middle section 417, and a conduit end section 419, which forms an opening 421.

In the embodiment shown in FIG. 4, the conduit middle section 417 enables a pass-through mechanism by including multiple fluid flow channels. In particular, in FIG. 4, conduit middle section 417 forms a primary channel 417a and one or more secondary channels 417b. Primary channel 417a forms a hollow cylinder concentric with the middle section and configured to house plug 408. Secondary channels 417b are formed between the outer wall of primary channel 417a and the outer wall of middle section 417. In some embodiments, secondary channels 417b include all or sections of a hollow cylindrical shell that is formed between these two walls and is concentric with the middle section.

Plug 408 may be inserted and move inside primary channel 417a. Plug 408 may have a diameter that is smaller than the inner diameter of primary channel 417a. Plug 408 can thus move inside primary channel 417a between conduit start 415 and conduit end 419. Further, upon reaching conduit end 419, plug 408 can block opening 421 to reduce or stop the fluid flow into outlet port 414.

The delayed shutoff device may not form a bypass gap, or may form a bypass gap that is negligible and does not satisfy the pass-through requirements for the device. If a bypass gap forms, its width, and thus the bypass quantity, may depend on the difference between the inner diameter of primary channel 417a and the outer diameter of plug 408. The bypass quantity may not reach the preset minimum quantity required as the minimum of the pass-through quantity. In some embodiments, the bypass quantity may be negligible.

For the pass-through quantity to reach the preset minimum quantity, the pass-through mechanism in FIG. 4 utilizes the one or more secondary channels 417b. Secondary channels 417b are formed outside primary channel 417a such that a part of the fluid flow can flow through them and reach outlet port 414. This secondary flow can occur while plug 408 moves inside primary channel 417a because of pressure exerted by the fluid inside primary channel 417a, also called the primary flow. In some embodiments, plug 408 blocks the secondary flow when it reaches conduit end 419. As explained above, at this point plug 408 may also bock the primary flow, either partially or completely.

Figure 5A:
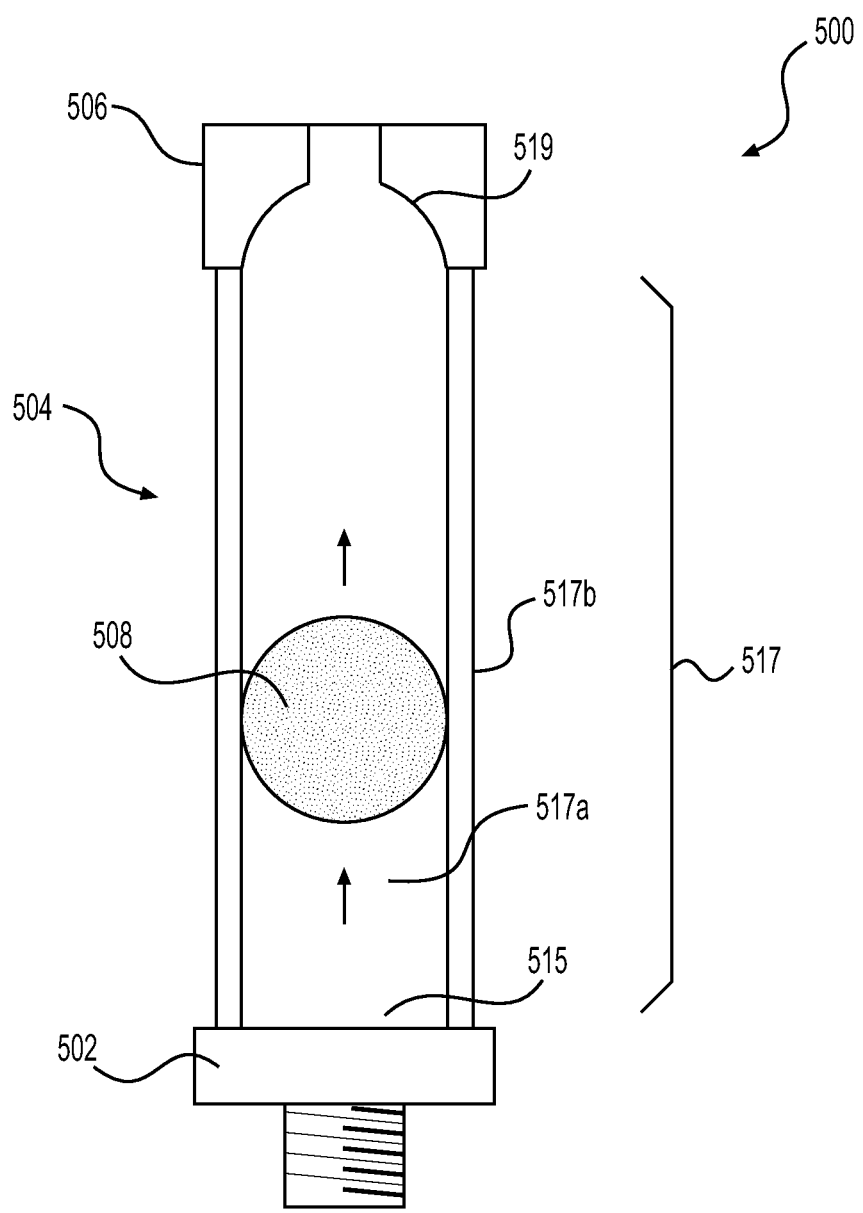
FIGS. 5A and 5B show different views of a delayed shutoff device with multiple secondary flow channels according to an embodiment.
Figure 5B:
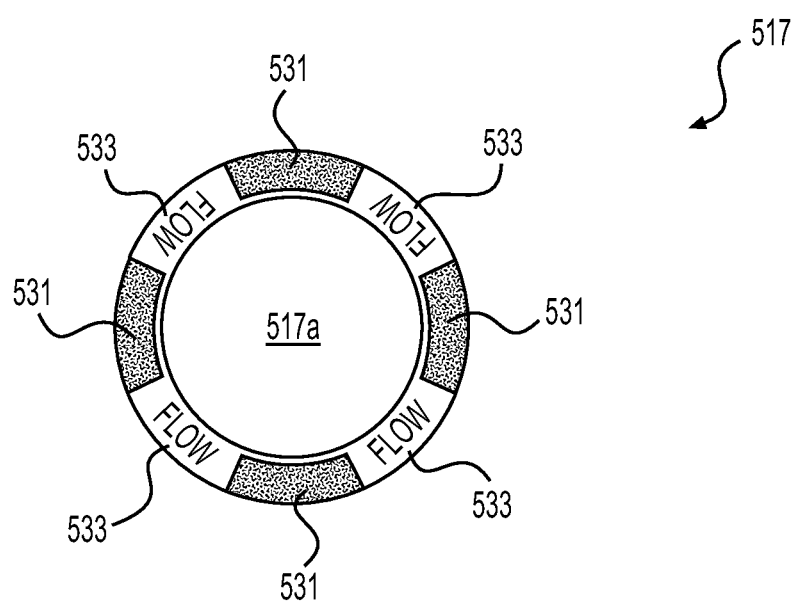

In some embodiments the pass-through mechanism includes more than one of these secondary flow channels. FIGS. 5A and 5B show one such embodiment. FIG. 5A shows a longitudinal cross section of a delayed shutoff device 500. Device 500 includes an inlet section 502, a conduit section 504, an outlet section 506, and a plug 508. Conduit section 504 includes a conduit start section 515, a conduit middle section 517, and a conduit end section 519. Conduit middle section forms a primary channel 517a and secondary channel section 517b.

FIG. 5B shows a transversal cross section of conduit middle section 517 with some details of secondary channel section 517b. In particular, secondary channel section 517b includes multiple, in this case four, ribs 531. Each rib 531 is located inside secondary channel section 517b and runs longitudinally alongside all or part of its length. An adjacent pair of ribs 531 form a secondary channel 533 between them. One or more secondary channels 533 are thus formed inside secondary channel section 517b. Secondary channels 533 are configured to let through at least part of the pass-through liquid from inlet section 502 to outlet section 506 while the fluid flows during the delay interval.

Figure 6:
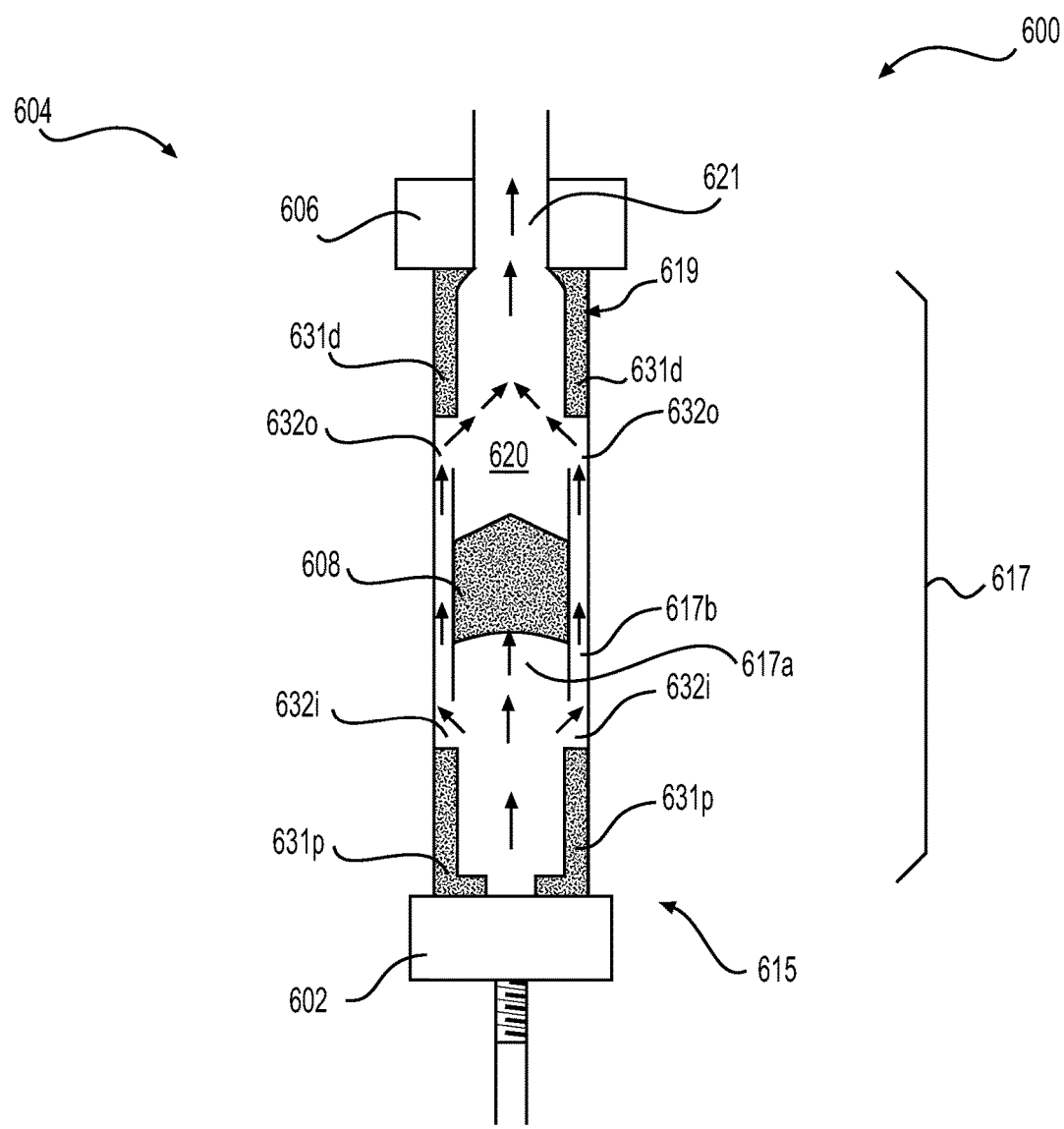
FIGS. 6 and 7 show longitudinal cross sections of delayed shutoff devices according to other embodiments.

FIG. 6 shows a longitudinal cross section of a delayed shutoff device 600 according to another embodiment. Device 600 includes an inlet section 602, a conduit 604, an outlet section 606, and a plug 608. Moreover, conduit 604 includes a conduit start section 615, a conduit middle section 617, and a conduit end section 619, which forms an opening 621. Conduit middle section 617 forms a primary channel 617a, and one or more secondary channels 617b.

In device 600, plug 608 is similar to plug 201 in FIG. 2 and it is configured to move inside primary channel 617a. In particular, plug 608 has a conical top. Conduit end section 619 forms a seat 620, which can be shaped as a truncated cone shell such that plug 608 can fit inside it.

Secondary channels 617b are formed in part by one or more ribs 631. In particular, the one or more ribs include one or more proximal ribs 631p that are closer to the conduit start 615, and one or more distal ribs 631d that are closer to conduit end 619. As shown in FIG. 6, a secondary channel 617b may be surrounded and formed by a proximal rib 631p, an outer wall of conduit middle section 617, a distal rib 631d, and an outer wall of primary channel 617a. Moreover, the combination of the outer wall of the primary channel and a proximal rib may define a secondary channel inlet 632i as an inlet between primary channel 617a and a secondary channel 617b. Similarly, the combination of the outer wall of the primary channel and a distal rib may define a secondary channel outlet 632o as an outlet between a secondary channel 617b and primary channel 617a.

The above configuration may allow the pass-through flow during a portion of the plug's movement inside the conduit. In particular, after plug 608 moves past proximal ribs 631p and secondary channel inlets 632i, a secondary flow can form. The path of this secondary flow starts from inlet section 602 and goes through the lower part of primary channel 617a (the part abutting proximal ribs 631p), secondary channel inlets 632i, secondary channels 617b, secondary channel outlets 632o, the upper part of primary channel 617a (the part abutting distal ribs 631d) and through opening 621. This secondary flow may stop after plug 608 reaches the upper part of primary channel 617a, because in that configuration plug 608 blocks the path of the secondary flow.

Figure 7:
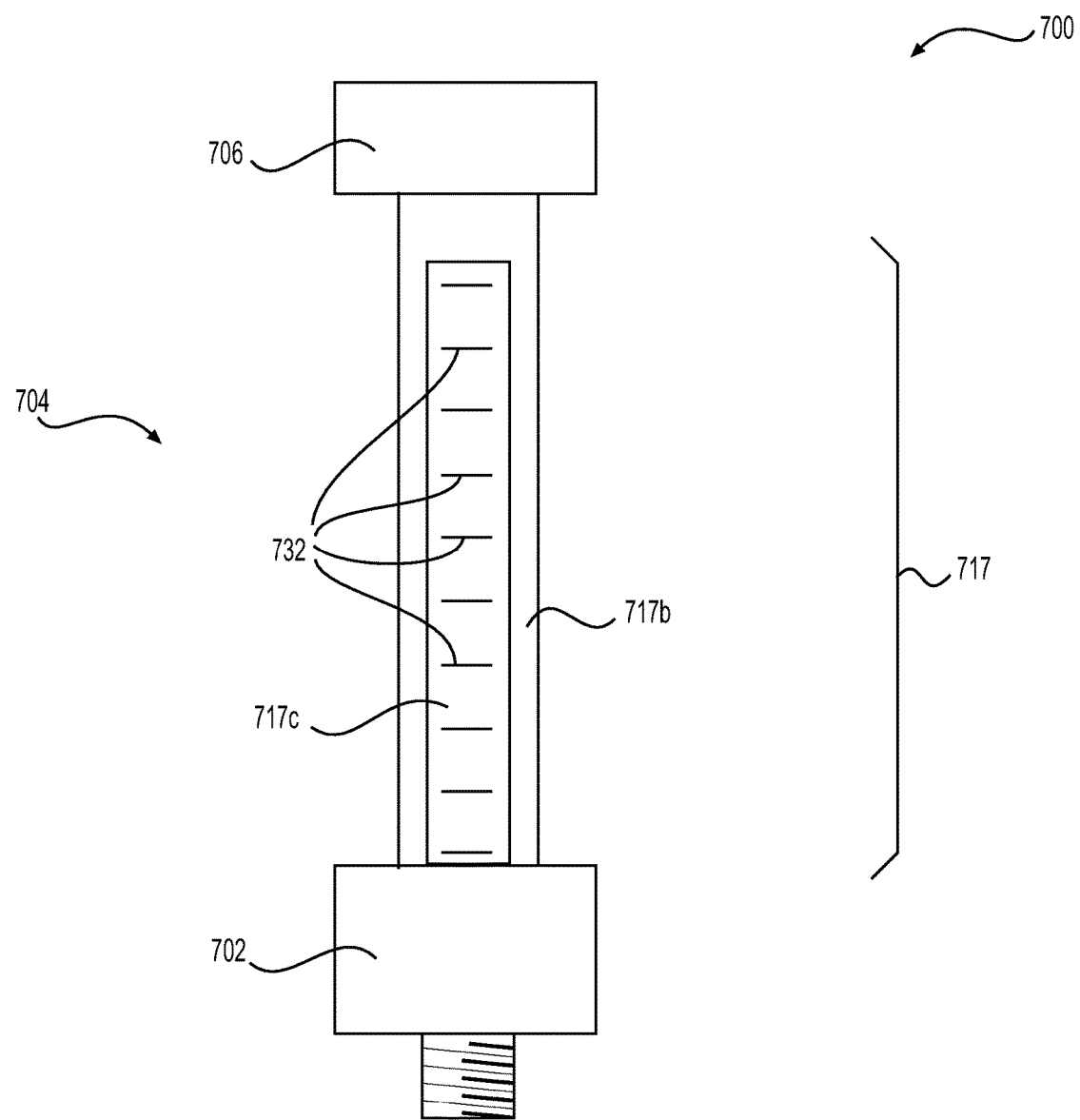

Some embodiments utilize multiple secondary channel inlets or outlets. FIG. 7 shows a longitudinal cross section of such a delayed shutoff device 700 according to an embodiment. Device 700 includes an inlet section 702, a conduit 704, and an outlet section 706. Moreover, conduit 704 includes a conduit middle section 717. Conduit middle section 717 includes a primary channel wall 717c that surrounds a primary channel. The primary channel wall 717c may be shaped, for example, as a cylinder, thus forming a cylindrical primary channel. The hollow volume between primary channel wall 717c and the outer wall of conduit 704 defines a secondary channel 717b.

Device 700 includes multiple secondary channel inlets or outlets. In particular, primary channel wall 717c includes multiple slots 732. These slots define openings between the primary channel surrounded by primary channel wall 717c and secondary channel 717b. During the delay interval and depending on the position of the plug, a slot may become an inlet into or an outlet from the secondary channel 717b. In particular, as the plug moves inside the primary channel toward the conduit end (i.e., toward outlet section 706), the plug passes by some of slots 732. These slots can become inlets into the secondary channel, allowing a secondary flow to pass through them into secondary channel 717*b*. The secondary flow may exit the secondary channel through a subset of slots 732 that are positioned ahead of plug 708. Therefore, as the plug proceeds in the secondary channel, the increasing number of slots that it leaves behind become inlets and the decreasing number of slots that are ahead of it become outlets. When the plug reaches the conduit end, no secondary channel outlets may remain and the secondary flow may stop.

The changing number of inlets and outlets into secondary channel 717*b* may change the amount of the secondary flow. A change in the amount of secondary flow may also change the pressure that the primary fluid flow exerts on the plug, and thus change the speed of the plug. In various embodiments, these changes may include increases or decreases. During some portion of the delay interval and as the plug moves forward, the secondary flow may increase due to the increase in secondary channel inlets, causing a decrease in the pressure of the primary flow and slowing down of the plug. On the other hand, during some portion of the delay interval and as the plug moves forward, the secondary flow may decrease due to the decrease in secondary channel outlets, causing an increase in the pressure of the primary flow and speeding up of the plug.

Figure 8A:
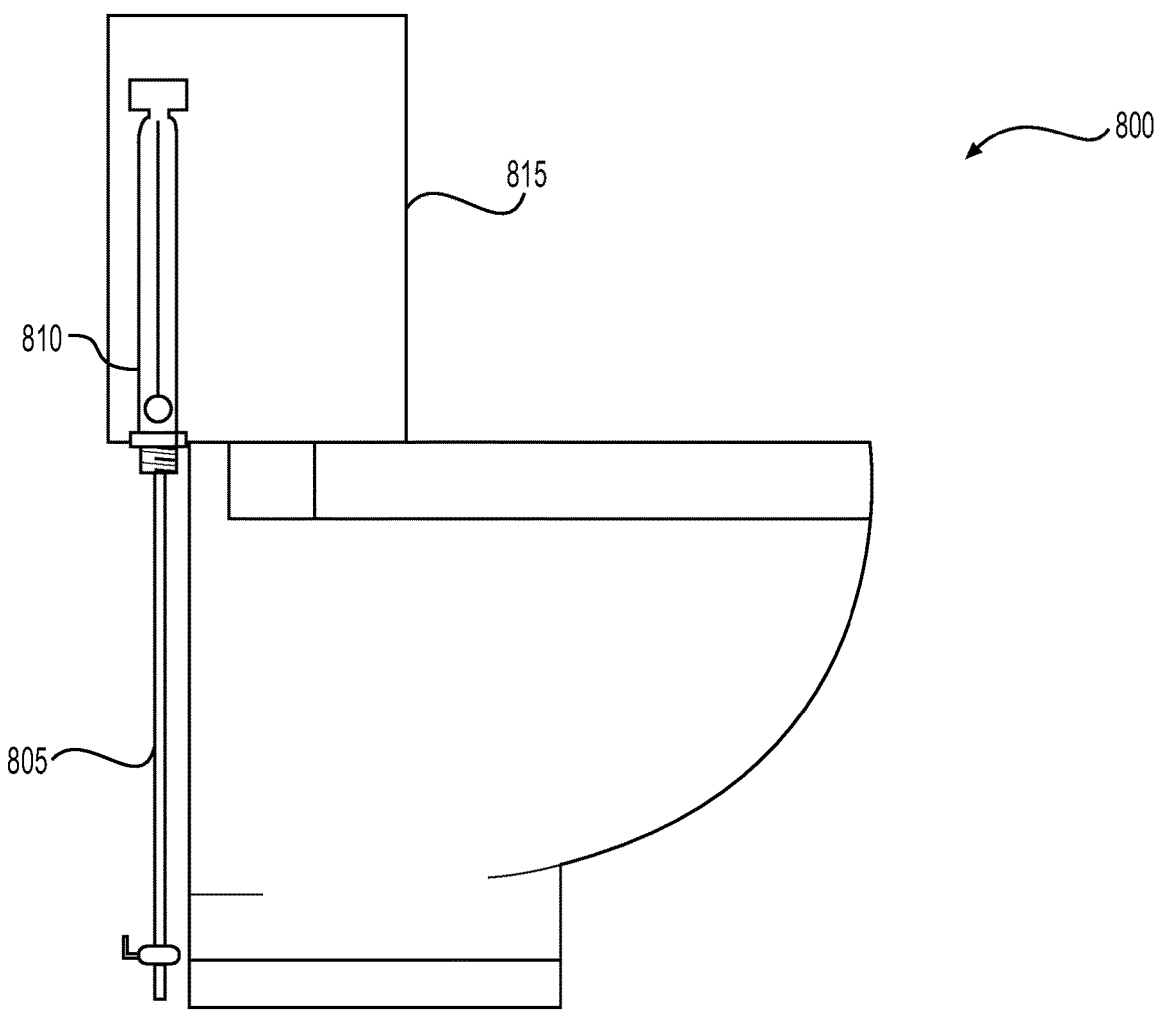
FIGS. 8A and 8B depict two different installation of delayed shutoff devices in combination with toilet tanks according to various embodiments.
Figure 8B:
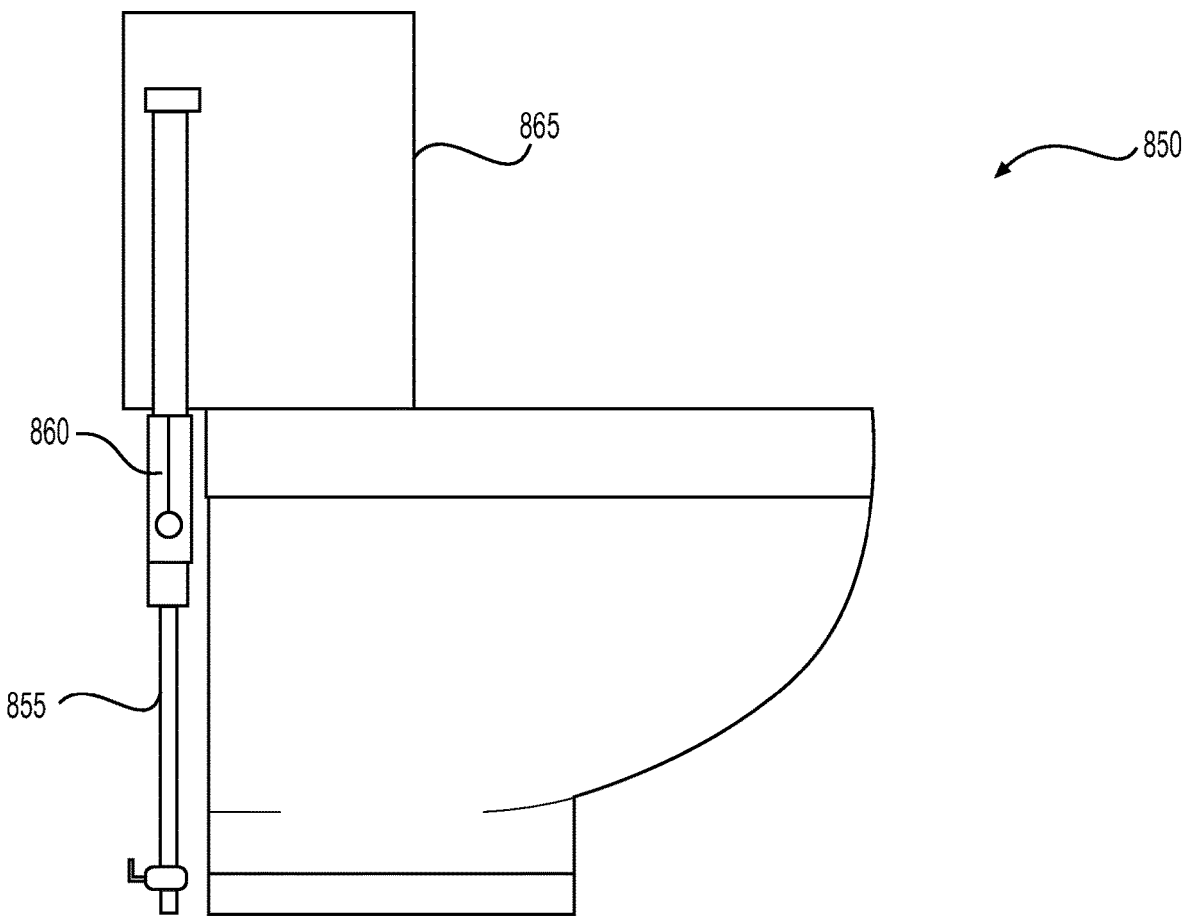

In some embodiments, a delayed shutoff device may be used in combination with other shutoff mechanisms. FIGS. 8A and 8B depict two different installations of these devices in combination with toilet tanks. In particular, FIG. 8A shows a toilet system 800 that includes a water inlet pipe 805, a delayed shutoff device 810, and a tank 815. In system 800, device 810 is installed inside tank 815 between inlet pipe 805 and the primary shutoff system of tank 815. FIG. 8B shows another toilet system 850 that includes a water inlet pipe 855, a delayed shutoff device 860, and a tank 865. In system 850, device 860 is installed outside tank 865 between inlet pipe 855 and the primary shutoff system of tank 865.

Some embodiments require tuning of a delayed shutoff device. For example, when a user installs a delayed shutoff device in a system such as those shown in FIGS. 8A and 8B, the user may have to tune the device to deliver the right amount of fluid to the system. In some embodiments, the tuning adjusts the pass-through quantity to be equal to or larger than the preset minimum quantity. For a system with a container, such as the tank in systems 800 and 850, the preset minimum quantity may be the capacity of the tank, or an amount that triggers a primary shut off mechanism. The preset minimum quantity may thus differ for different tank sizes. A user may tune the device such that the pass-through quantity exceeds the maximum of preset minimum quantities for different tanks, to take into account the variations among different tanks or for possible fluctuations in the operation of the primary shut off mechanism.

Moreover, the tuning may take into account different conditions under which the device may operate. The pass-through quantity may depend on various conditions. A change in the fluid pressure, for example, may change one or both of the delay interval and the pass-through quantity that passes through the device during the delay interval. Thus a user may tune the device under conditions related to its normal operation or under the least favorable conditions. That is, a user may, for example, tune the device such that its least pass-through quantity, which happens under the least favorable conditions, is larger than the largest required preset minimum quantity. Such a tuning may thus enable the device to operate under different conditions and for different preset quantities (e.g., tank capacities). For other conditions, the pass-through quantity may exceed the preset minimum quantity, which may still ensure proper operation.

Figure 9:
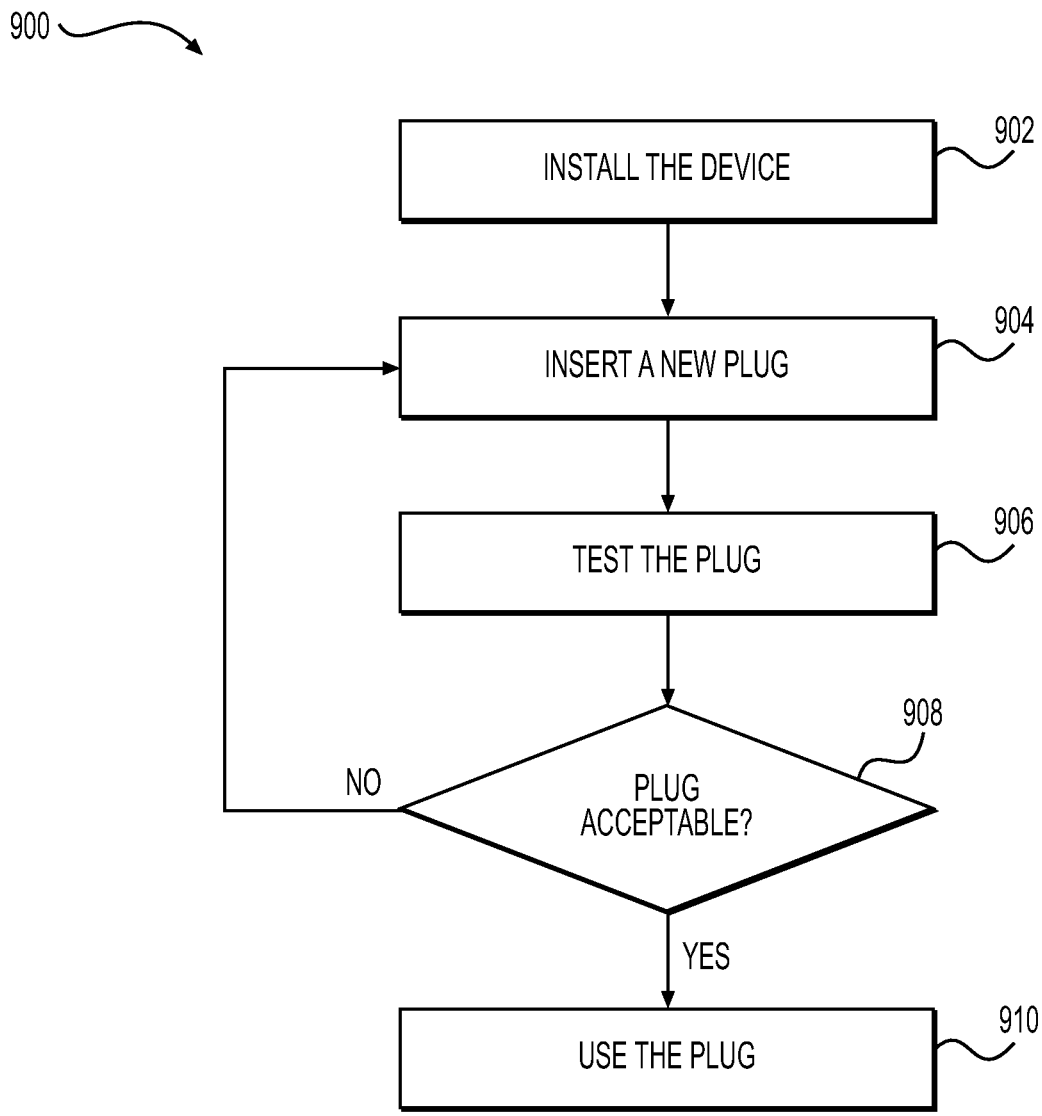
FIG. 9 shows a flowchart for a method of tuning the delayed shutoff device according to some embodiments.

FIG. 9 shows a flowchart 900 for a method of tuning the delayed shutoff device according to some embodiments. During the tuning, a user may make sure that the device operates properly under one or multiple configurations.

In block 902, the conduit is installed in an operational set up. In particular, the user may attach the device to a fluid source from which it will receive the fluid, and to a fluid target to which it will deliver the fluid. The user may, for example, attach an inlet section of the device to an inlet port and further attach an outlet section of the device to an outlet port. By doing so, the conduit section of the device will be connected to and positioned between the fluid source and the fluid target.

In block 904, a plug is inserted in the device. The device may be configured to work with any of a plurality of plugs. The plugs may be of different characteristics, such as different shapes, sizes, weights, or surface textures. Different sizes of the plugs may result in different by-pass gaps and thus different pass-through quantities. Different weights may result in different delay intervals and thus different pass-through quantities. Different shapes or textures may result in different seepage mechanisms and thus different reset delays. In block 904, the user may choose one of the multiple plugs to determine whether the plug provides acceptable results, e.g., an acceptable pass-through quantity.

In block 906, the inserted plug is tested. Testing the plug may include operating the device in its normal operation settings and determining whether the results are acceptable. A user may, for example, start the fluid flow and measure the delay interval after which the device shuts off the flow. Alternatively, the user may measure the amount of pass-through fluid that flows out of the device during the delay interval.

In decision block 908, the results are compared with acceptable results, e.g., a preset minimum quantity or a required delay interval. If the results are not acceptable (block 908: No), indicating that the plug is not acceptable, the process returns to block 904 for inserting and testing a new plug.

If, on the other hand, the results are acceptable (block 908: yes), the plug is accepted and left in the device for use.

In some embodiments, the device may be tuned by measuring a fill time and accordingly selecting a plug. For example, a user may allow the fluid to flow without using the delayed shutoff valve and measure the fill time, that is, the time that the system takes to deliver a pre-set quantity to the target. This pre-set quantity for a container, for example, may be the quantity that fills the container.

In some embodiments, a user measures the fill time by installing the delayed shutoff device without a plug and then letting the fluid flow. In such a case, the fluid flow may be faster than the pass-through flow, which occurs in the presence of the plug. Similarly, the fill time may be shorter than the delay interval.

Based on the fill time, the user may then derive the speed or pressure of the flow during the above tuning. This speed or pressure may guide the user to select a plug from a plurality of plugs. In some embodiments, the user may use a table that maps different fill times to corresponding plugs that should be used with that fill time to achieve a desired result. The desired result may, for example, include delivering a desired quantity of fluid to the target.

In some embodiment, a delayed shutoff device may be tuned in other ways, such as changing the tilt angle of the conduit. This change may change the effective component of the plug's weight and thus change the delay interval.

In some embodiments, the delayed shutoff device may further include a dial valve for tuning. In some embodiments, the dial valve may be attached before the inlet port, or after the inlet port and before the conduit. The dial valve may be configured to adjust the pressure of the inlet flow. Adjusting this pressure may change the delay interval. Thus, adjusting the dial valve may be used to tune the amount of pass-through quantity. The dial valve may be used in combination with one plug, or tested with multiple plugs, to achieve a required pass-through quantity.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the steps described need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

We claim:

1. A delayed shutoff device comprising:
a conduit configured to allow a fluid to flow through, wherein the conduit includes a conduit start and a conduit end; and
a plug configured to:
be placed inside the conduit at the conduit start;
move inside the conduit from the conduit start toward the conduit end when the fluid flows through the conduit; and
block the fluid flow upon reaching the conduit end, wherein:
the conduit and the plug are configured to allow a pass-through quantity of the fluid to pass through the conduit while the plug moves from the conduit start to the conduit end;
the conduit is configured to direct the fluid to flow to a container, the container being a toilet tank;
the conduit end forms a seat, the plug is configured to stop moving upon reaching the seat, and the plug is configured to fit the seat upon reaching the seat imperfectly, to allow a seepage of the fluid after reaching the seat; and
the pass-through quantity is larger than or equal to a preset minimum quantity.

2. The device of claim 1, wherein the imperfect fit results from one or more of a crack or a recession in a surface of the plug configured to touch the seat, a crack or a recession in a surface of the seat configured to touch the plug, and a difference in a shape of the plug and a shape of the seat.

3. The device of claim 1, wherein the plug is configured to stop the fluid flow upon reaching the conduit end.

4. The device of claim 1, wherein the plug is configured to substantially reduce the fluid flow upon reaching the conduit end.

5. The device of claim 4, wherein substantially reducing the fluid flow includes allowing a fluid seepage through the conduit end.

6. The device of claim 1, further comprising a pre-shutoff reset mechanism, wherein the pre-shutoff reset mechanism enables the plug to return to the conduit start if the fluid flow stops before the plug reaches the conduit end.

7. The device of claim 1, further comprising a post-shutoff reset mechanism, wherein the post-shutoff reset mechanism enables the plug to return to the conduit start when a pressure of the fluid is reduced after the plug reaches the conduit end.

8. The device of claim 1, wherein the conduit is configured to direct the fluid to flow to a container, the device further comprising a seepage channel configured to allow the fluid to seep between the conduit and the container after the plug reaches the conduit end.

9. The device of claim 8, wherein the seepage channel includes an imperfection in a fit between the plug and the conduit end.

10. The device of claim 8, wherein the seepage channel is configured to allow the fluid to seep from the conduit into the container after the plug reaches the conduit end.

11. The device of claim 1, wherein:
the conduit end is a distal end of the conduit;
the conduit further including a proximal end;
the conduit is configured to allow the fluid to flow from the proximal end to the distal end; and
the conduit is configured to be installed such that the distal end is higher than the proximal end.

12. The device of claim 1, wherein:
the plug is configured to move inside the conduit toward the conduit end due to a pressure of the fluid flow.

13. The device of claim 1, wherein:
the conduit includes a hollow cylinder;
the conduit end includes an end of the hollow cylinder;
the plug is placed inside the hollow cylinder; and
the plug is configured to move along a long axis of the hollow cylinder toward the end of the hollow cylinder.

14. The device of claim 1, wherein the plug includes a spherical ball, a cylinder with a conical end, or a disk.

15. The device of claim 1, wherein:
the conduit forms at least a primary channel and a secondary channel;
the primary channel is configured to house the plug and direct the plug toward the conduit end; and
the secondary channel is configured to allow at least part of the pass-through quantity to pass through the conduit before the plug reaches the conduit end.

16. The device of claim 1, wherein:
the conduit forms a passage configured to house the plug and direct the plug toward the conduit end; and
the plug is sized such that it allows at least part of the pass-through quantity to flow through the passage while the plug moves inside the conduit toward the conduit end.

17. The device of claim 1, wherein:
the plug is configured to move inside the conduit for a time duration that is longer than or equal to a preset duration of time before reaching the conduit end.

18. The device of claim 17, wherein the preset duration of time depends on one or both of a characteristic of the plug and a characteristic of a fluid flow.

19. The device of claim 18, wherein the characteristic of the plug includes one or more of a weight of the plug, a shape of the plug, or a size of the plug.

20. The device of claim 18, wherein the characteristic of the fluid flow includes one or more of a pressure of the fluid flow, a speed of the fluid flow, and a density of the fluid.

21. The device of claim 1, wherein:

the plug is a first plug of a plurality of plugs configured to be placed inside the conduit;

the plurality of plugs differ in one or more characteristics; and the one or more characteristics of the first plug are such that the first plug allows the pass-through quantity to pass through the conduit before the first plug reaches the conduit end.

22. The device of claim 1, wherein:

the container is attached to a primary shut off system configured to stop the fluid flow when the container is filled to the capacity; and the device blocks the fluid flow when the primary shut off system does not function as configured.

23. The device of claim 1, wherein a fluid is water.

24. The device of claim 1, wherein the conduit and the plug are configured to reset the device when the fluid flow stops before the plug reaches the conduit end.

25. The device of claim 24, wherein resetting the device includes the plug returning to the conduit start.

26. A method for tuning a delayed shutoff device, wherein the device comprises:

a conduit configured to:
   connect a source of a fluid to a target, and
   allow the fluid to flow through the conduit from the source to the target; and a plug configured to:
   be placed inside the conduit, and
   block the fluid flow after a pass-through quantity passes through the conduit from the source to the target;

the method comprising: attaching the conduit to the source and to the target;

testing the plug, wherein the testing includes:
   placing the plug inside the conduit;
   causing a fluid to flow through the conduit from the source to the target;
   measuring the pass-through quantity; and accepting the plug when the pass-through quantity is larger than or equal to a preset minimum quantity, wherein tuning comprises tilting the conduit and, wherein the target is a toilet tank, a sprinkler or a pool filter.

27. The method of claim 26, wherein:

the plug is a first plug;

the delayed shutoff device comprises a second plug; and the method further comprises:

rejecting the first plug when the pass-through quantity is smaller than the preset minimum quantity; and testing the second plug.

* * * * *

UNITED STATES PATENT AND TRADEMARK OFFICE
CERTIFICATE OF CORRECTION

| | |
|---|---|
| PATENT NO. | : 9,790,676 B2 |
| APPLICATION NO. | : 14/340743 |
| DATED | : October 17, 2017 |
| INVENTOR(S) | : Scribner et al. |

Page 1 of 1

It is certified that error appears in the above-identified patent and that said Letters Patent is hereby corrected as shown below:

Page 2; (56) References Cited; Line 18 please amend:
"727,244 A1 4/2015 Hashimoto"
To:
--727,244 A 5/1903 Wilkinson--

Signed and Sealed this
Twenty-sixth Day of December, 2017

Joseph Matal
*Performing the Functions and Duties of the
Under Secretary of Commerce for Intellectual Property and
Director of the United States Patent and Trademark Office*